(12) United States Patent
Li et al.

(10) Patent No.: US 6,895,123 B2
(45) Date of Patent: May 17, 2005

(54) FOCUS CONTROL METHOD FOR DELTA-SIGMA BASED IMAGE FORMATION DEVICE

(75) Inventors: Pai-Chi Li, Taipei (TW); Jing-Jung Huang, Tainan Hsien (TW); Shue-E Chen, Tainan Hsien (TW); You-Ling Gau, Yunghe (TW); Tzu-Yin Chu, Junghe (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 664 days.

(21) Appl. No.: 10/035,144

(22) Filed: Jan. 4, 2002

(65) Prior Publication Data

US 2003/0128868 A1 Jul. 10, 2003

(51) Int. Cl.[7] .................................................. G06K 9/40
(52) U.S. Cl. ...................................... 382/255; 382/264
(58) Field of Search .............................. 382/128, 133, 382/159, 251, 254, 255, 260, 264, 291; 600/300, 437, 439, 443, 447; 128/916, 920

(56) References Cited

U.S. PATENT DOCUMENTS

| | | | | | |
|---|---|---|---|---|---|
| 3,786,184 | A | * | 1/1974 | Pieters | 348/345 |
| 4,045,804 | A | * | 8/1977 | Takeda et al. | 396/101 |
| 5,182,649 | A | * | 1/1993 | Miyazaki | 348/349 |
| 5,740,270 | A | * | 4/1998 | Rutenberg et al. | 382/133 |
| 6,327,377 | B1 | * | 12/2001 | Rutenberg et al. | 382/133 |
| 6,454,713 | B1 | * | 9/2002 | Ishibashi et al. | 600/439 |
| 6,517,486 | B1 | * | 2/2003 | Li | 600/443 |
| 6,582,369 | B1 | * | 6/2003 | Huang et al. | 600/447 |

* cited by examiner

*Primary Examiner*—Andrew W Johns
*Assistant Examiner*—Amir Alavi
(74) *Attorney, Agent, or Firm*—Bacon & Thomas PLLC

(57) ABSTRACT

Disclosed is focus control method for Delta-Sigma based image formation devices in which a steering term and a focusing term of a delay formula are respectively quantized, and corresponding two channels at both sides of the probe are synchronized by a delay produced during dynamic focusing. During synchronizing the two channels, two numeral values with equal absolute value but with opposite signs are respectively inserted so as to eliminate extra noise the signals are after summing up, and controlling common delay of the two channels is performed by same one controller. After summing up the inserted two values, the dynamic aperture control of the Delta-Sigma based image formation device can be effectively realized and noise during dynamic focusing also is eliminated thereby achieving an ideal single bit output.

5 Claims, 10 Drawing Sheets

FOCUS CONTROL METHOD FOR DELTA-SIGMA BASED IMAGE FORMATION DEVICE

BACKGROUND OF THE INVENTION

1. Field of the Invention

The present invention relates to a focus control method for Delta-Sigma based image formation devices, in particular, to a newly developed focus control method by delay-sum calculation for an image formation device capable of eliminating noises when a Delta-Sigma based image formation device is performing dynamic focusing without affecting advantages of the single bit output of the Delta-Sigma converter.

2. Description of the Prior Art

Digital image formation has been widely applied in medical ultrasound because it is capable of providing precise focusing. In a conventional digital ultrasonic imaging system, 8–10 bit analog/digital (A/D) converters are used with a sampling frequency from 20~40 MHz. At this frequency, it is necessary to employ an interpolation circuit to achieve an effective time delay accuracy at 32 times the center frequency. Conventionally, filtering or phase rotation is employed to up-sample accuracy of delay value. On the other hand, a Delta-Sigma based analog/digital converter {DS A/D} was suggested to design a ultrasound imaging system. In this case, the complicated interpolation circuit is no more required because a higher sampling frequency has been obtained, a single bit output can greatly reduce system size, and a system utilizing the DS A/D converter can obtain the same image quality as that of a conventional system while the system complexity is greatly simplified.

The advancement of VLSI has increased the speed of the digital circuit more than the improvement of the accuracy of an analog circuit. Hence, it is preferable to use an over-sampling A/D converter and subsequent digital signal processing. Due to the difficulties concerning circuit design, such an A/D converter has been used for signals at lower frequencies. Since each input signal affects the output signal, a filter is required to reconstruct the original signal. Referring to FIG. 1(a), wherein x[n] is an output, and y[n] represents an output before reconstruction. By using a noise to model the quantization effect as shown in FIG. 1(b), wherein e[n] represents the inserted quantization noise. In discrete time, the following equation is obtained:

$$Y(Z)=X(Z)Hx(Z)+E(Z)He(Z) \quad (1)$$

wherein Y(Z) is an output signal, X(Z) is an input signal, E(Z) is the added quantization noise, while Hx(Z) is a transfer function of the input signal and He(Z) is a transfer function of the noise. The aim of oversampling is for obtaining a sufficient bandwidth for the noise energy.

For a Delta-Sigma converter, signal to quantization noise ratio (SQNR) after signal reconstruction can be expressed as:

$$SQNR=A \times log2OSR+6 \times (B-1)+C(dB) \quad (2)$$

Wherein A is a constant in relation with the order of the A/D converter and noise shaping. OSR is an over sampling ratio which is defined as a ratio of sampling frequency to Nyquist frequency wherein Nyquist frequency of a typical ultrasound signal is generally 3~4 times of the center frequency. B is the number of bits of a quantizer which is generally 1 for a Delta-Sigma converter, C is a constant determined by the dynamic range of the signal. Among them the most critical factors are A and OSR. As an example. 40 dB of SQNR, which is approximately equivalent to a convenient 7-bit A/D converter, can be obtained by using second-order low pass Delta-Sigma converter with an 8 times over sampling ratio. A further improvement is possible by employing a higher over sampling ratio.

In a scheme shown in FIG. 2 which utilizes a two-order low pass Delta-Sigma converter, x[n], e[n], and x*[n] respectively represent an input, an added quantization noise, and an output, all working at 32 times the signal center frequency. The Delta-Sigma converter increases the SQNR due to the over sampling frequency. In this scheme, as the sampling frequency is doubled, SQNR will be raised by 15 dB, equivalent to 2.5 bits for conventional A/D converters. For each channel, the input signal x[n] is converted to a single bit output y[n] by the Delta-Sigma converter. The signal after sampling is stored in a single bit shift register, and then is appropriately delayed by a controller. As the sampling frequency is 32 times the signal center frequency, the interpolation circuit is not required. The single bit signal obtained from each channel are delayed and summed to form a beam. The quantization noise in present in the high frequency region and it can be filtered out by a low pass filter, also known as the reconstruction filter. After reconstruction, the signal is decimated to 4 times of the center frequency so as to reduce high speed computations. The entire image formation system is shown in FIG. 3, it is an image formation device designed by using Delta-Sigma converters. After the signal is time gain compensation (TGC), it is converted to a single bit signal through Delta-Sigma A/D converter. This signal is then stored in a shift registor to be selected by the delay controller and a multiplexer. The delayed signal from each channel on the probe is summed to obtain a beam which further goes through the low pass filter for reconstruction and is decimated to a lower frequency so as to simplify subsequent signal processing. On the other hand, TGC is also used to match the dynamic range of the Delta-Sigma converter.

The system in this scheme has a new problem when carrying out the dynamic delay control. Due to the fact that synchronization between modulation and demodulation is destroyed by dynamic focusing, the signal energy is affected and the background noise increases. Several solutions have been proposed, but all these require extra bits to encode the output, resulting in increased system complexity.

It is what the object that the inventor has endeavored for many years in conducting intensive research and simulations in order to solve the above depicted shortcomings of the conventional system, and finally succeeded in realization of the present invention.

SUMMARY OF THE INVENTION

It is a first object of the present invention to provide a focus control method for a Delta-Sigma based image formation device by which a steering term and a focusing term in a delay formula are independently quantized, and the corresponding channels at both sides of a probe are synchronized by a delay produced during the dynamic focusing.

It is a second object of the present invention to provide above described method wherein during synchronizing the delay of the aforesaid two channels a numeral value with the same absolute value but with an opposite sign are added so as to eliminate extra noises after summing up.

It is a third object of the present invention to provide above described method wherein, due to the symmetrical characteristic, either a Delta-Sigma based image formation device or a common image formation device is able to be controlled the common delay of corresponding channels at two sides of the probe by the same controller.

It is a fourth object of the present invention to provide above described method wherein, by offering respectively a numeral value with the same absolute value but an opposite sign to two inactive corresponding channels at both sides of a Delta-Sigma based image formation device so as to close the channels after summing up the two values thereby achieving effective dynamic control of an aperture.

For achieving aforesaid objects, the present invention provides a focus control method for a Delta-Sigma based image formation device in which a steering term and a focusing term in a delay equation are respectively quantized, and corresponding two channels at both sides of the probe are synchronized by a delay produced during dynamic focusing. During synchronizing the two channels, a numeral value with equal absolute value but with opposite signs are respectively added so as to eliminate extra noises after summing up, and controlling common delay of two channels of the probe is performed by the same controller. After summing up the aforementioned added two values, the dynamic control of aperture of the Delta-Sigma based image formation device can be effectively realized and noises during dynamic focusing also is eliminated thereby achieving ideal single bit output.

BRIEF DESCRIPTION OF THE DRAWINGS

The drawing disclose an illustrative embodiment of the present invention which serves to exemplify the various advantages and objects hereof, and are as follows.

DETAILED DESCRIPTION OF THE PREFERRED EMBODIMENT

The present invention provides a new method for eliminating noises during the operation of dynamic focusing using a Delta-Sigma based image formation device without losing the advantages of single bit output of the same device. Based on the fact the beam signal required to form an image is a sum of the signals received by all channels of the probe, the image quality is not degraded if the noise can be compensated in the sum. To achieve this aim, the added data needs to be of equal absolute value but with an opposite sign, and is inserted in the same time instance; thus the method being called the symmetric method. Since only two logic levels are used, the single bit output of the Delta-Sigma converter does not change.

Figure 4:
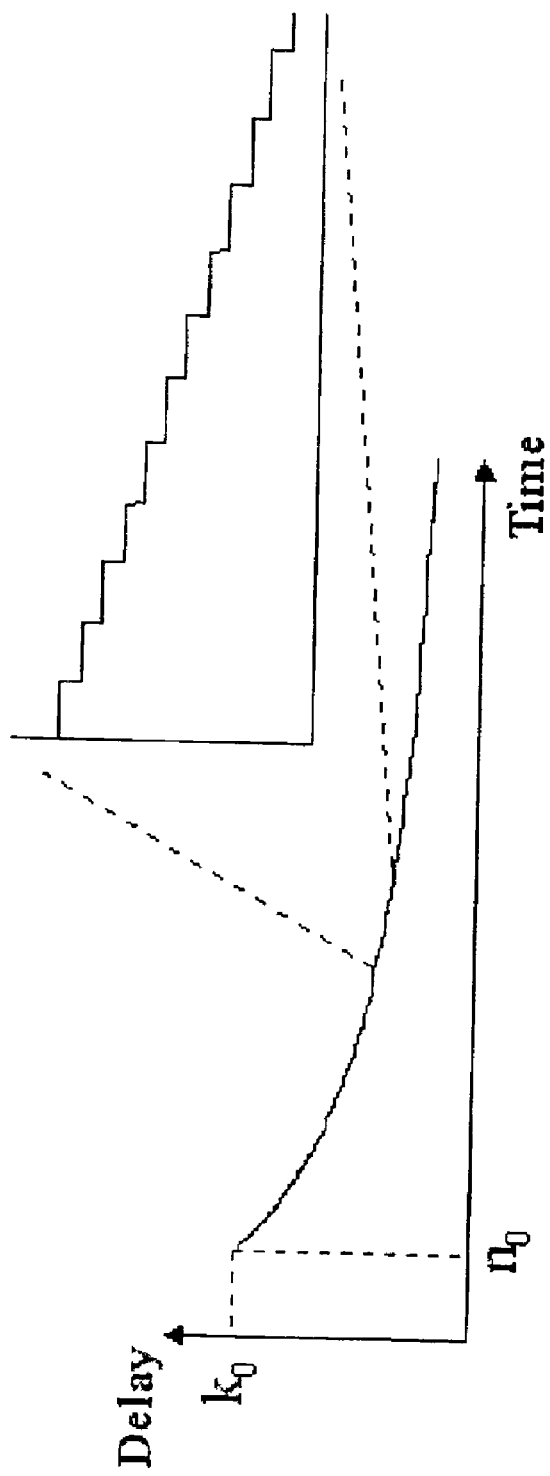
FIG. 4 is a time-delay characteristic curve for dynamic focusing in a Delta-Sigma based scheme.

If the focusing delay is not synchronized, a higher background noise is introduced. In the fixed focusing case, the difference of image formation between a conventional beam former and the Delta-Sigma based beam former results from the different SQNR's of the two A/D converters. On the other hand, for dynamic focusing, the focusing delay changes with time (depth), and the delay gradually decreases for a certain channel. A time-delay curve is shown in FIG. 4 wherein ko and no respectively represent an initial delay and an initiated time instance. It is observed that the delay curve decreases in a step-wise fashion due to delay quantization. An extra value is inserted when the delay changes. In a conventional system, this extra value can be linearly interpolated or directly repeats the previous value without affecting the image quality. However, for the Delta-Sigma converter, this value becomes a noise because there is a subsequent reconstruction filter. If a non-zero value is inserted, it must be compensated before the image is formed. Otherwise, image noise is increased.

Figure 5A:
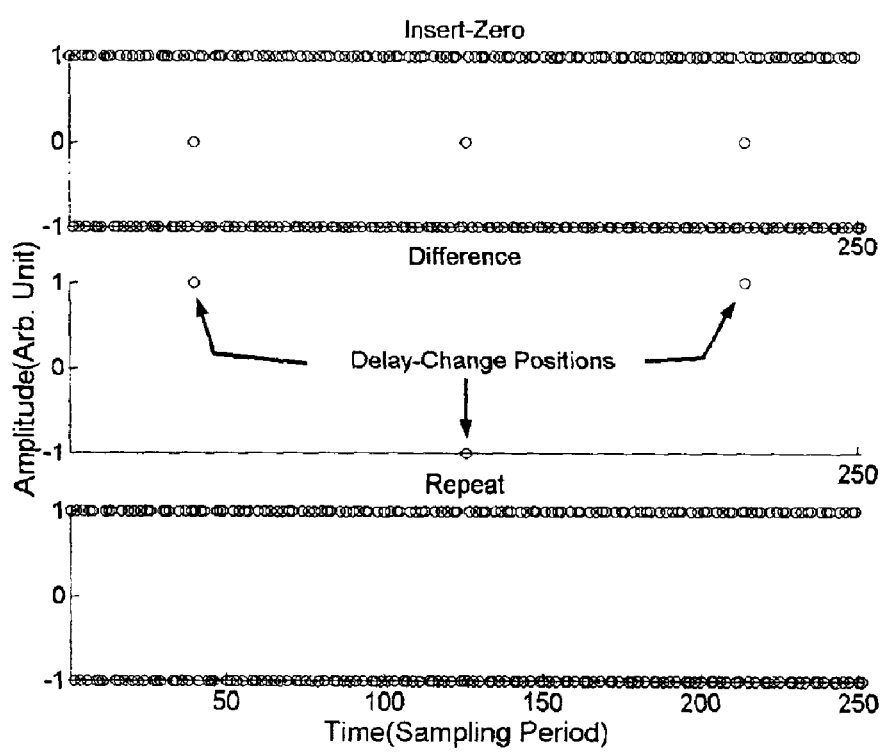
FIG. 5(a) is a schematic view of a signal before inserting a sampling value.
Figure 5B:
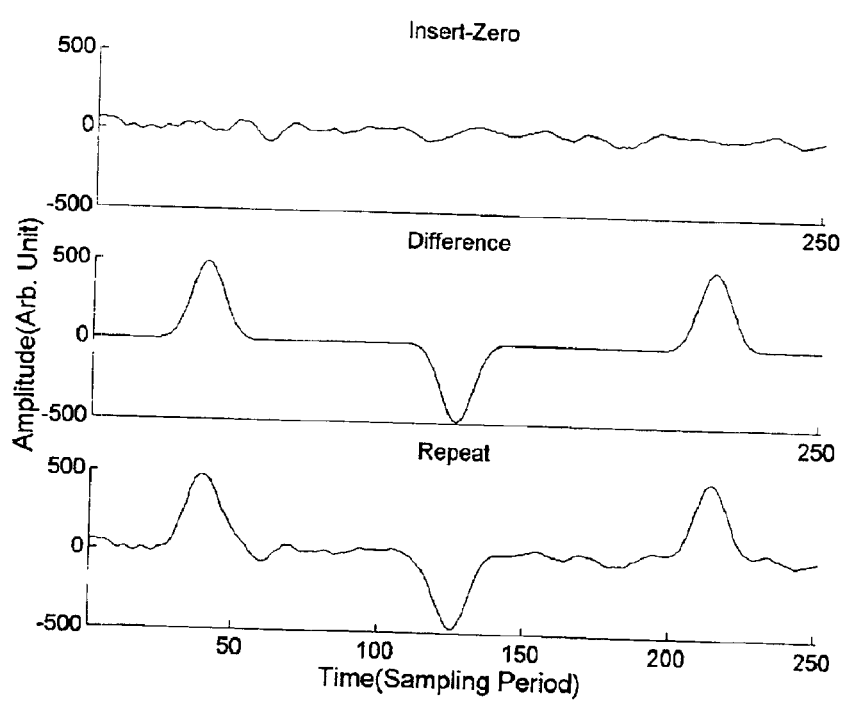
FIG. 5(b) is the wave form of a reconstructed signal after inserting a sampling value.
Figure 6:
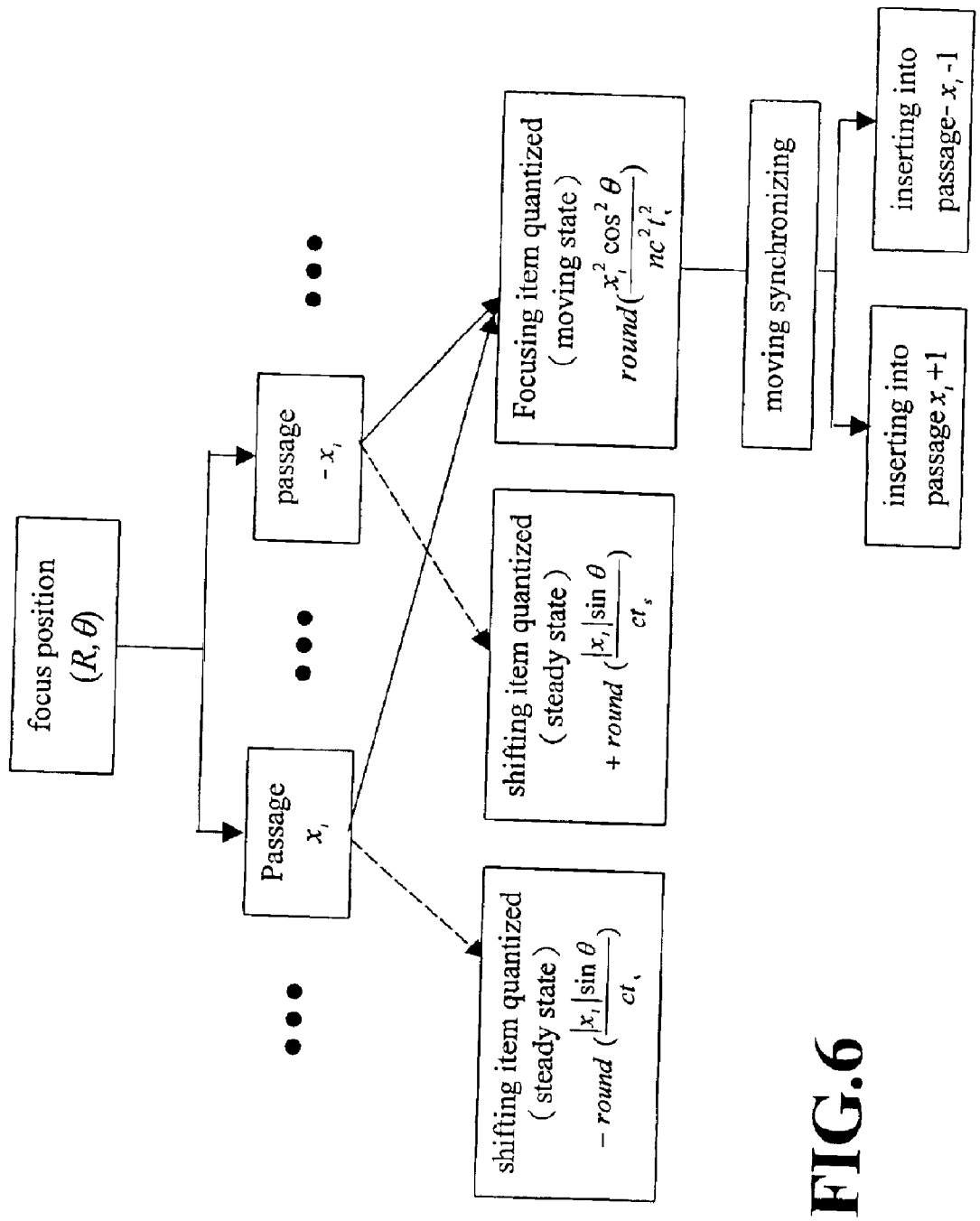
FIG. 6 is a flow chart illustrating focus control method for the Delta-Sigma based image formation device according to the present invention.

FIG. 5(a) and 5(b) show a schematic diagram of a signal before inserting an extra value, and the reconstructed waveform after the insertion. In FIG. 5(a), the first row shows the insert-zero method where zero is inserted; the third row shows a repeat method, and in the second row, three values are inserted in three sampling positions. The waveforms of the reconstructed signals of FIG. 5(a) are shown in Fig.(b). It is indicated that a strong noise is induced after inserting a non-zero value. In FIG. 5(a), the single-bit signal shown at the top is the output of a small amplitude noise, wherein new samples are required at the points indicated by the arrows for dynamic focusing. With the insert-zero method, two bits are needed for the three logic levels. Another method is to repeat the previous value (i.e., the repeat method) in order to maintain two logic levels. In this case, the output needs only a single bit but the inserted value results in a strong noise. As shown in FIG. 5(a), the delay change positions are shown in the middle panel and the corresponding output is shown in the bottom panel. From the reconstructed waveforms shown in FIG. 5(b), it is demonstrated that the inserted signal becomes the filter's impule response after reconstruction. In the waveform obtained from the repeat method, an extra noise of produces a noise that has a higher amplitude than that of the waveform obtained from the insert-zero method. As a result, the image quality is significantly degraded. On the other hand, the insert-zero method does not suffer from this problem as shown in FIG. 5(b). Nonetheless, the insert-zero method requires an extra bit to represent the output signal.

Apparently, the best solution is to maintain a single bit output and to avoid the noise problem. By selecting an appropriate inserted value based on the symmetric property of the delay profile, it is possible to achieve this goal. In other words, since a beam is formed by summed up signals from all channels, if it is possible to arrange two channels symmetric with respect to the probe center, the time for delay change can be synchronized. By making two inserted values to have equal absolute value but opposite sign, the noise can be compensated in the final sum, thereby obtaining an image similar to that obtained by the insert-zero method.

The proposed single-bit technique can be applied to sector format, linear format and curved linear scan format. For a sector scan image, the received delay can be expressed as $$t_{rx}(x_i, R, \theta) \approx \frac{x_i^2 \cos^2\theta}{2Rc} - \frac{x_i \sin\theta}{c}, \quad (3)$$

where Xi is the distance from channel i to the array center, r, (R, θ) is the polar coordinate representation of the focal point and c is the sound velocity. The delay values can be computed in real-time or stored in a pre-calculated look up table. The first term in the above equation is referred to as the focusing term and the second term represents the steering term. For a fixed beam and a fixed channel, the focusing term changes only with the image depth.

Figure 1:
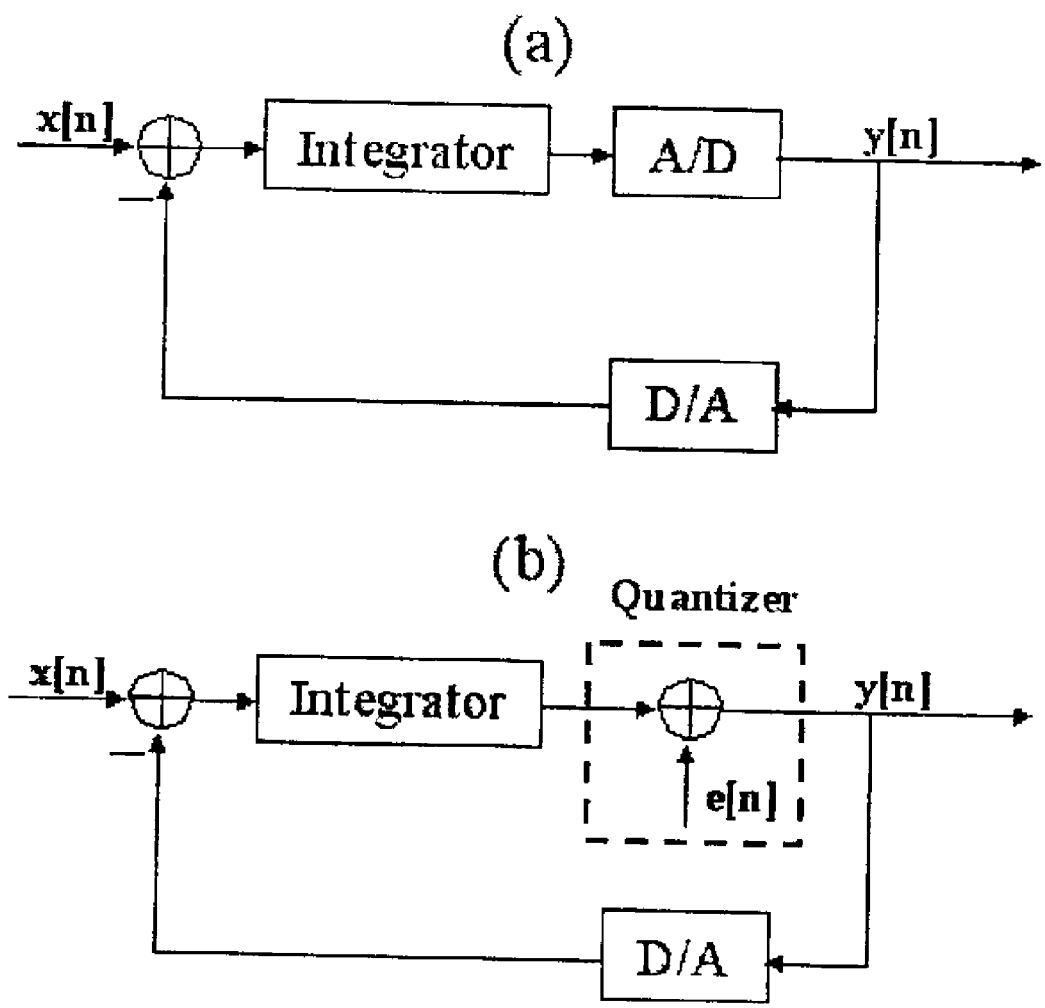
FIG. 1(a) is a schematic view showing layout of inner components for a conventional Delta-Sigma converter.
FIG. 1(b) is a schematic view of a conventional Delta-Sigma converter in which a quantization noise is inserted.
Figure 2:
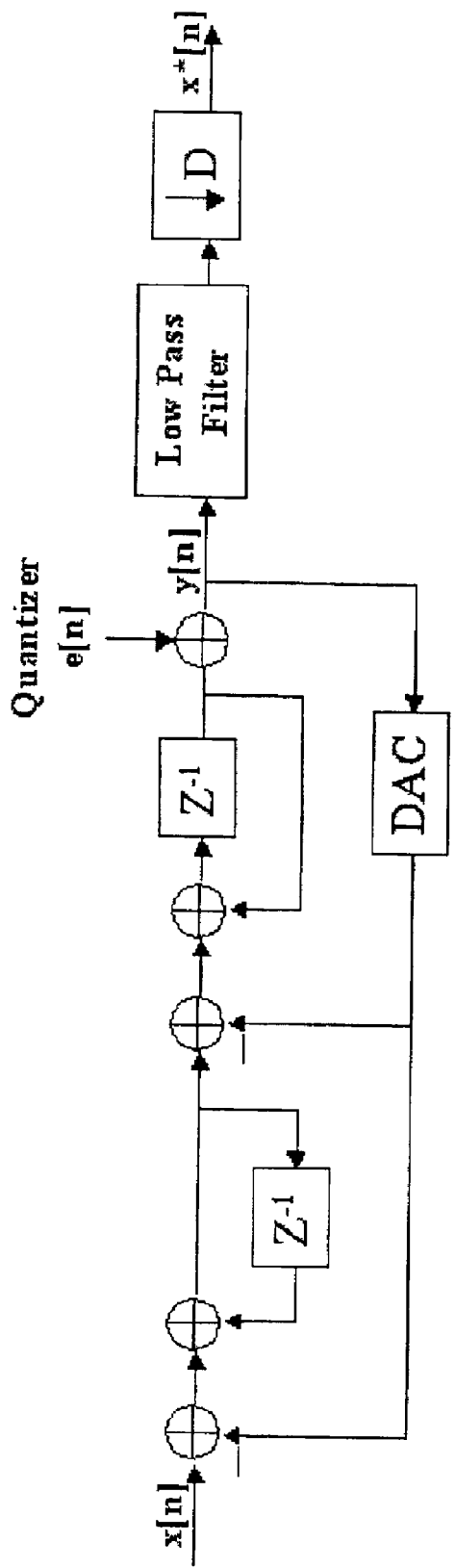
FIG. 2 is a schematic view of a conventional second-order low pass Delta-Sigma converter.
Figure 3:
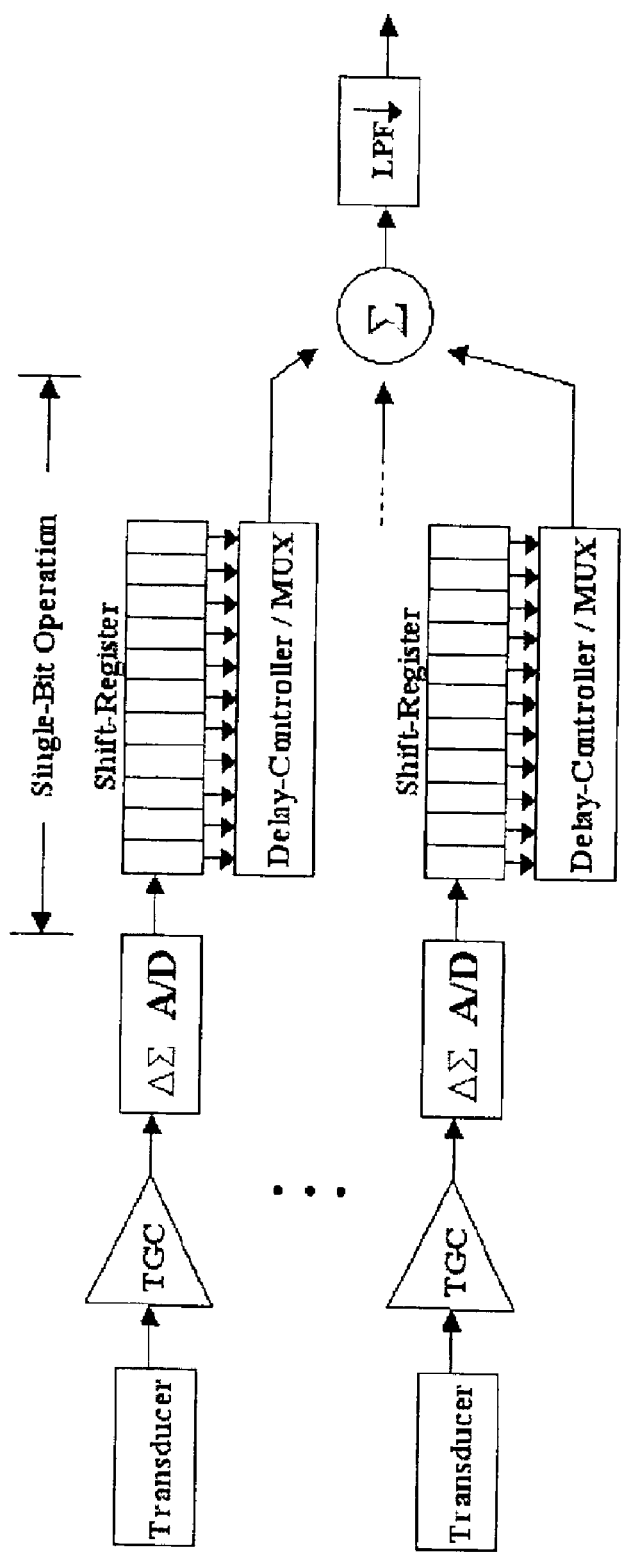
FIG. 3 is a schematic view showing layout of inner components for a conventional Delta-Sigma based image formation device.

As previously mentioned, the delays must be quantized in a digital system. Assume that the quantized delay interval is $t_s$, R can be represented by $R=nct_s/2$, where n is the clock index. Output of the single-bit shift register shown in FIG. 2 is generally determined by $$k_n = \text{round}\left(\frac{x_i^2 \cos^2\theta}{nc^2 t_s^2} - \frac{x_i \sin\theta}{ct_s}\right). \quad (4)$$

New samples need to be inserted when $k_{n+1}=k_n-1$. With the insert-zero technique, a trigger is generated and a zero-valued sample is produced.

Without delay quantization and assuming an N channel array, channel i and channel N−i+1 have the same focusing delay. Since the steering term is not a function of R, the overall delay described changes only with the focusing term for a fixed beam. With delay quantization, however, synchronization may be disrupted due to rounding of the delay value. The synchronization can be easily maintained if the focusing term and steering term are quantized separately. In other words, we have:

$$k_n' = \text{round}\left(\frac{x_i^2 \cos^2\theta}{nc^2 t_s^2}\right) \pm \text{round}\left(\frac{|x_i|\sin\theta}{ct_s}\right), \quad (5)$$

where the sign of the steering term is determined by the sign of $x_1$. Based on the above equation, the delay change of channel i is synchronous with that of channel N−i+1.

The synchronous delay changes for two symmetric channels can be exploited to design a single-bit focusing scheme without introducing additional noise. This is done by assigning the inserted values of the two symmetric channels with opposite signs. In other words, if +1 is assigned to channel i, −1 is inserted to channel (N−i+1). The approach can be implemented such that +1 is always assigned to the first half of the array and −1 is always assigned to the other half of the array. Note that the delay control logic for the two symmetric channels is identical. Hence, only N/2 delay controllers are needed for an N channel array, assuming N is even. The proposed approach will be referred to as the symmetric-hold approach.

The method of the present invention can be illustrated with reference to FIG. (6), wherein for a focus point located at (R,θ), the delay required for the distance X1 consists of two terms: the steering term and the focusing term. These two terms should be individually quantized. For the steering term, the inserted values for the two channels are in equal absolute value but with opposite signs; while for the focusing term, the above symmetric property can be applied and hence the same controller can be used. Only plus and minus ones are added.

Emulated images using real ultrasound data are presented. A traditional 10-bit beamformer and a Delta-Sigma based beamformer were simulated. The ultrasound data were originally sampled at 13.8889 MHz. A radio frequency (RF) beamforming technique was first applied. The RF beamformer linearly interpolated the ultrasound data to an effective sampling frequency of 111.1 MHz (i.e., 8 times the original sampling frequency). A Delta-Sigma beamformer working at 111.1 MHz was also simulated by up-sampling the original RF data 8 times before the data were sent to the Delta-Sigma A/Ds. A phantom consisted of 6 nylon wires in water was used to demonstrate efficacy of various beamforming techniques. In all images, uniform apodization with a receive f/number of 1.5 was applied. The transmit focus was at 60 mm with a transmit f/number of 2. All wire images are displayed over a 70 dB dynamic range.

Figure 7:
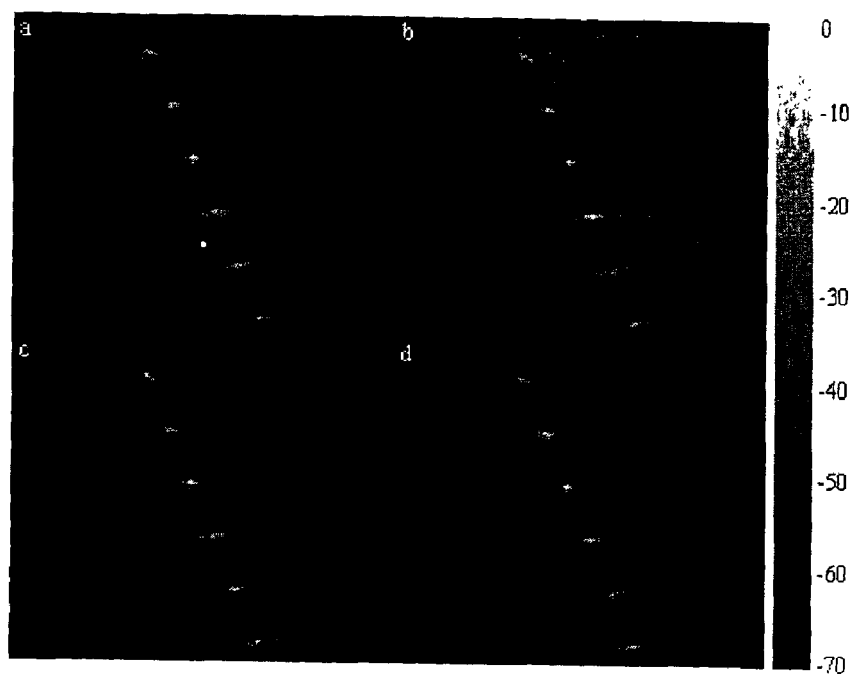
FIG. 7 is a schematic view showing a nylon wire image at 70 dB dynamic range.

FIG. 7 shows the images generated by a traditional 10-bits RF beamformer (panel (a)), Delta-Sigma based beamformer with the repeat technique (panel (b)), Delta-Sigma based beamformer with the insert-zero technique (panel (c)) and Delta-Sigma based beamformer with the proposed symmetric-hold technique (panel (d)). Obviously, the image using the repeat method has an increased noise background. Panels (c) and (d) show that the single-bit symmetric-hold technique has the same performance as the insert-zero approach. The difference in the noise floor between panel (a) and panels (c) and (d) is due to the lower SQNR of the Delta-Sigma A/D. Higher order modulators and higher sampling rates can be used to increase the SQNR.[12]

Figure 8:
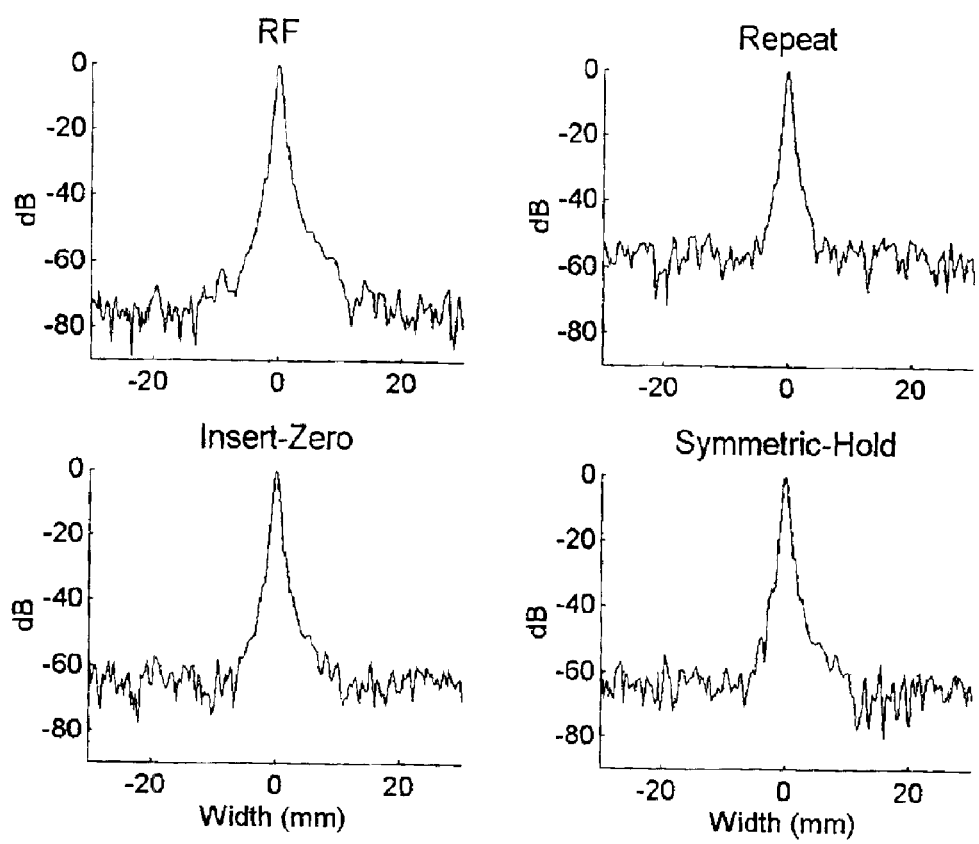
FIG. 8 is a cross sectional view of the wire located at the third position from the topmost one in FIG. 7.

FIG. 8 shows the lateral beam plots of the third wire from the top in FIG. 7. In all cases, the mainlobe widths are approximately the same. The main difference is in the noise level. The noise level of the conventional RF beamformer is lower than 70 dB. For the insert-zero technique and the symmetric-hold technique, the noise level is at about −60 dB. The noise level increases to around −55 dB with the repeat technique.

Figure 9:
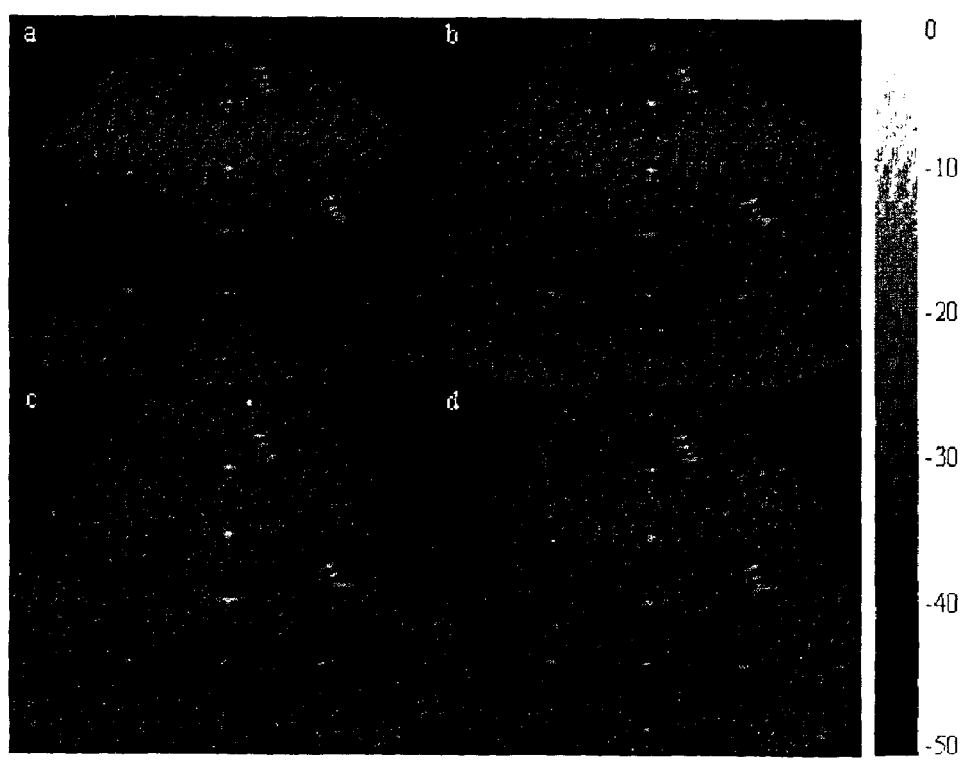
FIG. 9 is a schematic view showing an image of a tissue mimicking phantom at 50 dB moving range.

Images of a tissue-mimicking phantom using the four techniques are shown in FIG. 9 with the same display format as in FIG. 5 except that the display dynamic range is 50 dB. Results are consistent with the wire images. With the increased noise floor, contrast of the anechoic objects is significantly affected.

In the present invention, synchronization of the delay change for corresponding channels at both sides of the probe can be performed by the same controller in order to minimize the number of delay controllers. In addition, for the Delta-Sigma based beam former the above mentioned method can be utilized to control the effective aperture width and to reduce the noise during dynamic focusing while maintaining a single bit output.

It emerges from the description of the above embodiment that the invention has several noteworthy advantages when compared with any conventional technique, in particular:

1. The steering term and the focusing term in the delay formula can be separately quantized, and a delay produced in two corresponding channels at both sides of the probe is synchronized during dynamic focusing.
2. During synchronizing the delay of aforesaid channels, a numeral value with the same absolute value but with an opposite sign is added to the corresponding channel so as to eliminate extra noise after the signals being summed up.
3. Due to the symmetry, either a Delta-Sigma based, or a conventional image formation device is able to be controlled by the common delay of corresponding channels at two side of the probe with the same controller.
4. By offering respectively a numeral value with the same absolute value but a different sign to two inactive channels at both sides of a Delta-Sigma based image formation device so as to turn off the channel after summing up the two values thereby achieving effective dynamic control of the aperture.

It is therefore to be understood that the above and other modifications and changes may be readily made in the construction and arrangement of elements comprising the preferred and modified forms of invention without departing from the spirit and scope of the invention as defined by the appended claims and reasonable equivalent thereof.

What is claimed is:

1. A focus control method for Delta-Sigma based image formation devices wherein synchronizing a delay of two corresponding channels at both sides of a probe, and numeral value with the same absolute value but with a different sign being added to said corresponding channels so as to eliminate extra noise after the signals being summed up, and to control the delay change of said two channels with the same controller thereby saving ½ of said controllers, and performing dynamic control the aperture of the probe and eliminating noise during dynamic focusing so as to maintain a single bit output by this character thereby finally forming a beam signal required for an image by the Delta-Sigma based image formation device and maintaining quality of said image with compensation by summing up said added values.

2. The control method of claim 1, wherein said control method is applicable to all types of probes, wherein the equation for focusing is expressed:

$$t_{rx}(x_i, R, \theta) \approx \frac{x_i^2 \cos^2\theta}{2Rc} - \frac{x_i \sin\theta}{c},$$

wherein Xi is the distance from the i-th channel to the probe center, (R,θ) is the polar coordinate of a specified point in a sound field, c is the velocity of sound; the value of delay can be calculated from the system or by referring to a table, in the above equation, the first term represents focusing, the second term represent beam steering, the change of focusing item is only related to distance R.

3. The method of claim 1, wherein it is necessary to quantize a delay in a digital system, assuming the sampling period is ts, and distance R is expressed by R−ncts/2, wherein n is a clock index, then a delay index is expressed:

$$k_n = \text{round}\left(\frac{x_i^2 \cos^2\theta}{nc^2 t_s^2} - \frac{x_i \sin\theta}{ct_s}\right).$$

when Kn+1=Kn−1, a new sample must be inserted whose value depends on the selection method.

4. The control method of claim 1, wherein during dynamic focusing, the steering term is never changed with the change of distance, but the focusing item decreases as the value of n increases, neglecting the effect of quantized delay and assuming the number of channels is N, the two corresponding channels i and N−i+1 at both sides of the probe have similar focusing term, but the synchronization of this system is destructed by the quantized delay causing these two channels to occur delay change respectively at different times, here, so-called synchronization denotes the change of the delay index K occurs at the similar time point, the focusing term and the steering term are quantized as the following equation:

$$k_n' = \text{round}\left(\frac{x_i^2 \cos^2\theta}{nc^2 t_s^2}\right) \pm \text{round}\left(\frac{|x_i|\sin\theta}{ct_s}\right),$$

wherein "+" or "−" given to the two items in the equation is determined whether X value is plus or minus, as the shifting term has been quantized into an integer independently so that the time for change of delay index is only determined by the focusing item.

5. The control method of claim 1, wherein said synchronizing delay characteristic is utilized to design a single bit output without adding extra noise, two values with equal absolute value but opposite signs are respectively inserted into said two corresponding channels, i.e. inserting "+1" in one channel, while inserting "−1" in the other channel such that one half side of the probe is always inserted with "+1", while the other half side id always inserted "−1" so that the delay control logic is completely identical for said two symmetric channels, hence, a probe with N passages requires only M/2 delay control logic circuit.

* * * * *